Figure 5:
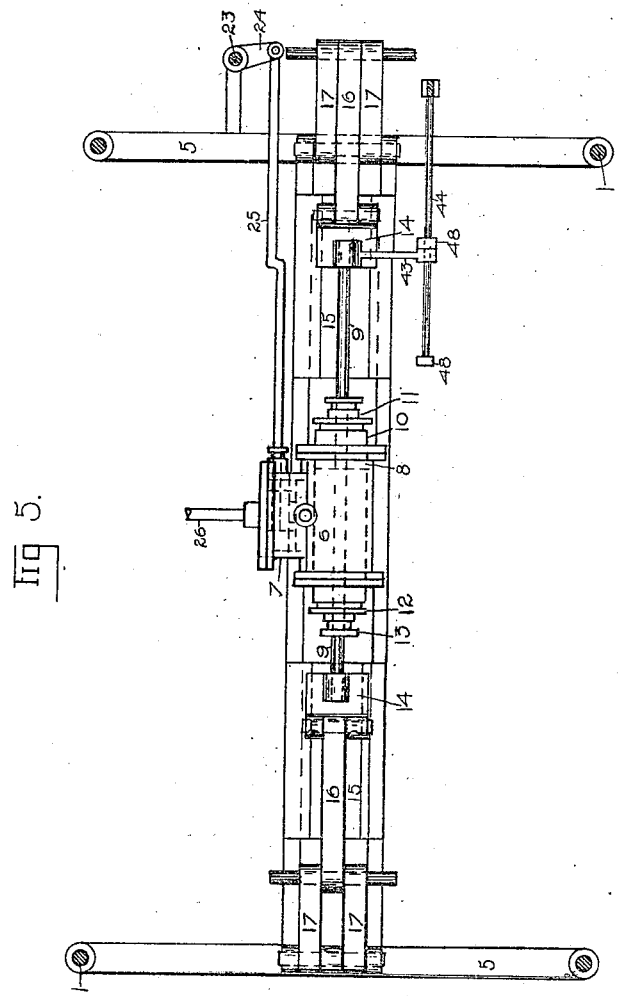

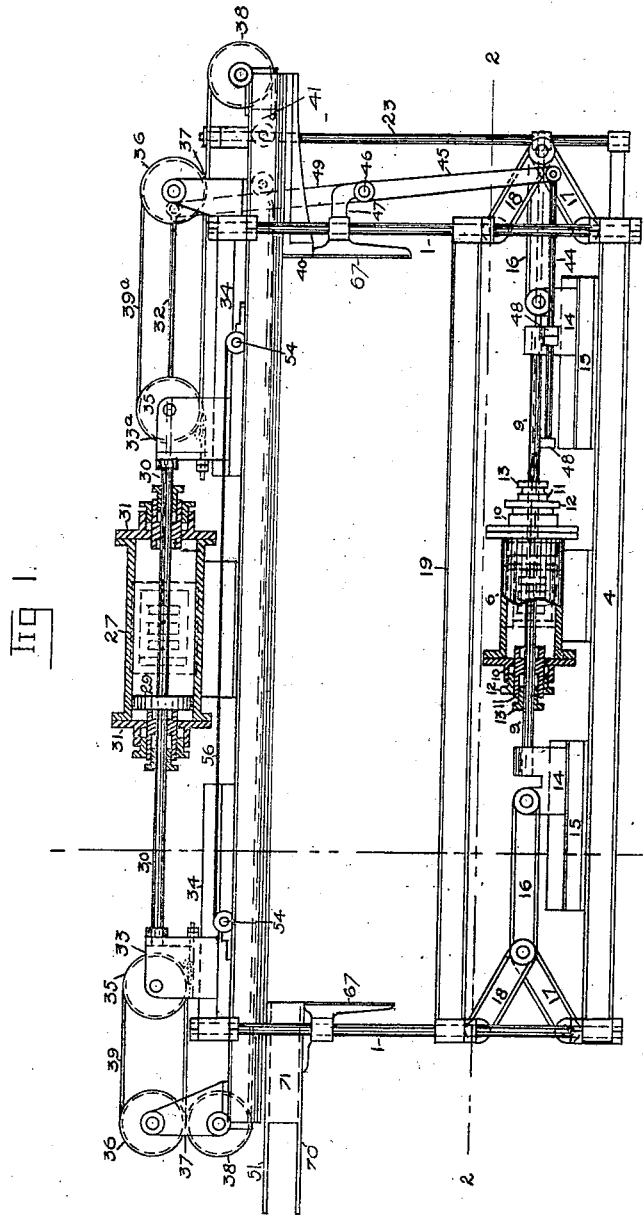

No. 727,115. PATENTED MAY 5, 1903.
H. ECKERSON.
MATTRESS FILLING MACHINE.
APPLICATION FILED OCT. 4, 1902.
NO MODEL. 5 SHEETS—SHEET 2.
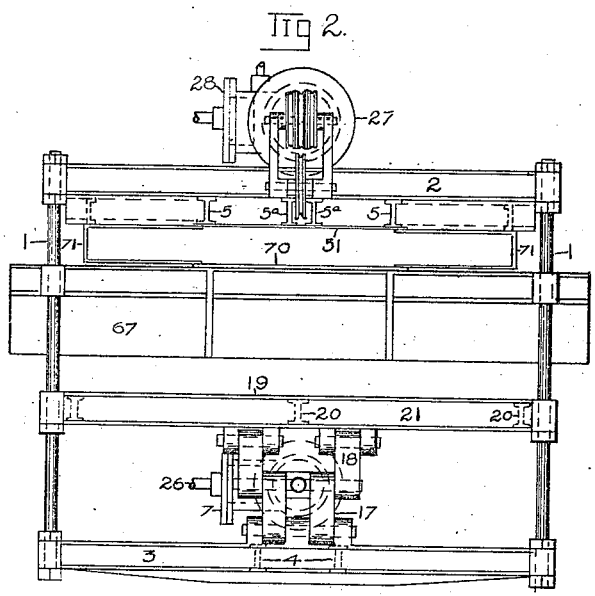
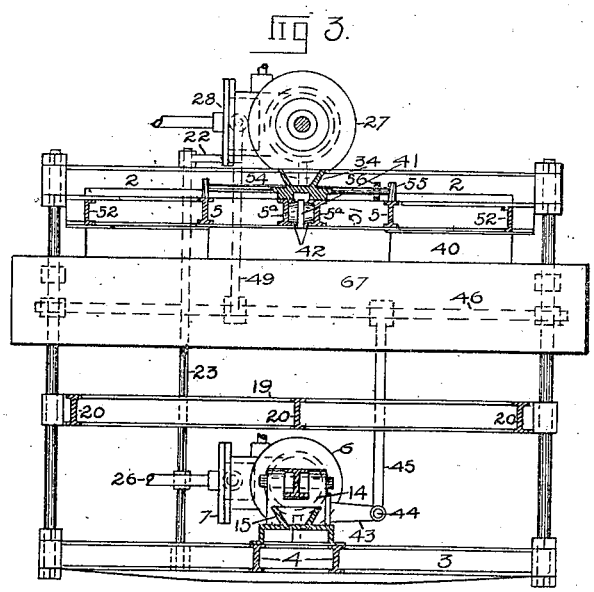
WITNESSES
INVENTOR
Homer Eckerson
BY
Atty.

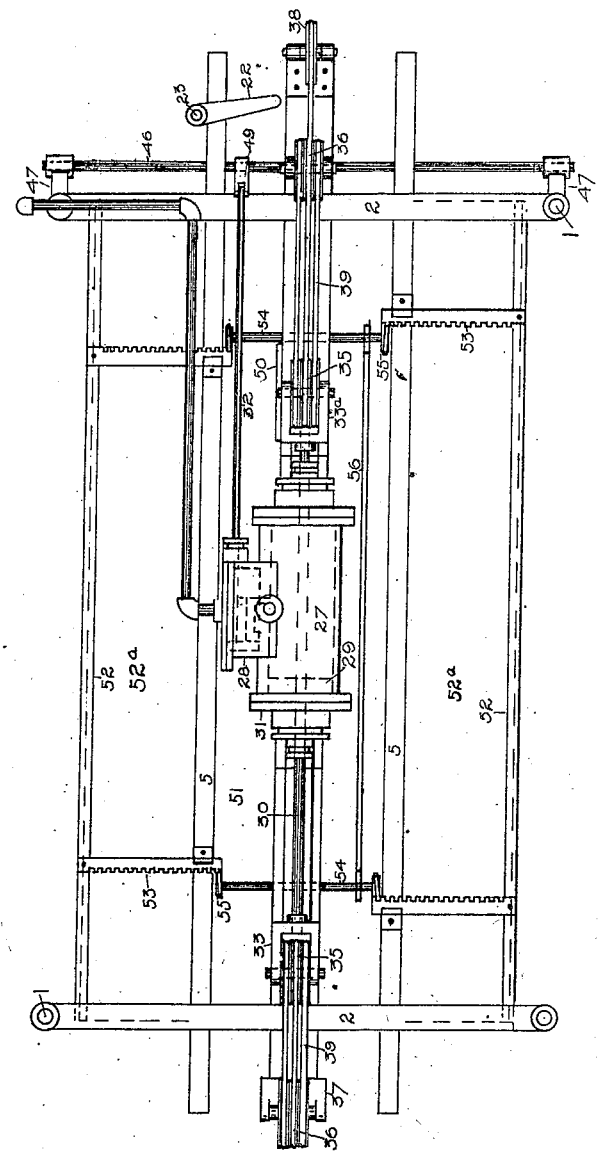

No. 727,115. PATENTED MAY 5, 1903.
H. ECKERSON.
MATTRESS FILLING MACHINE.
APPLICATION FILED OCT. 4, 1902.
NO MODEL. 5 SHEETS—SHEET 4.

WITNESSES
INVENTOR
Homer Eckerson.
BY
Atty.

No. 727,115. PATENTED MAY 5, 1903.
H. ECKERSON.
MATTRESS FILLING MACHINE.
APPLICATION FILED OCT. 4, 1902.
NO MODEL. 5 SHEETS—SHEET 5.
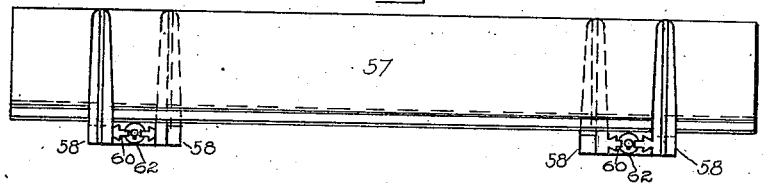
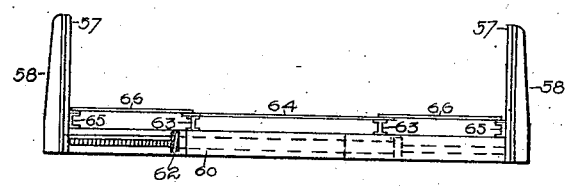
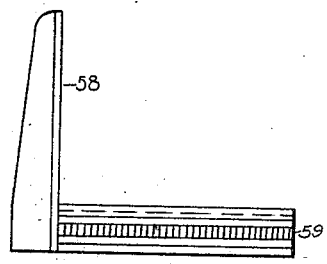 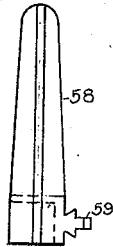
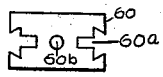
 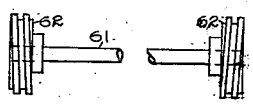
INVENTOR
Homer Eckerson.

No. 727,115.

Patented May 5, 1903.

UNITED STATES PATENT OFFICE.

HOMER ECKERSON, OF MECHANICSVILLE, NEW YORK.

MATTRESS-FILLING MACHINE.

SPECIFICATION forming part of Letters Patent No. 727,115, dated May 5, 1903.

Application filed October 4, 1902. Serial No. 125,973. (No model.)

*To all whom it may concern:*

Be it known that I, HOMER ECKERSON, a citizen of the United States, residing at Mechanicsville, in the county of Saratoga and State of New York, have invented certain new and useful Improvements in Mattress-Filling Machines; and I do hereby declare the following to be a full, clear, and exact description of the invention, such as will enable others skilled in the art to which it appertains to make and use the same.

My invention relates to mattress-filling machines, and has for its object to provide a machine, simple and efficient in construction, adapted to readily insert filling material evenly and uniformly into a mattress-cover. This I accomplish by the means illustrated in the accompanying drawings, in which—

Figure 1 is a sectional side elevation of a machine embodying my invention. Fig. 2 is an end elevation of said machine. Fig. 3 is a transverse section taken on line 1 1 of Fig. 1. Fig. 4 is a plan view of said machine. Fig. 5 is a plan view taken on line 2 2 of Fig. 1. Fig. 6 is a side elevation of a cradle or former. Fig. 7 is an end elevation of said former. Fig. 8 is a side elevation of a bracket adapted to support the sides of a former. Fig. 9 is an end view of said bracket. Fig. 10 is a plan view of the under side of said bracket. Fig. 11 is an end view of a transverse bar forming part of a former. Fig. 12 is a sectional plan view of said transverse bar. Fig. 13 is a sectional plan view of a worm-shaft. Fig. 14 is an end view of the same.

As illustrated in the drawings, the main frame of the machine consists of vertical standards 1, upper transverse bars 2, lower transverse bars 3, secured to said standards, central longitudinal bars 4, secured at their ends to the lower transverse bars 3, and upper longitudinal bars 5, secured at their ends to the upper transverse bars 2. The main frame of the machine may be of any other suitable construction, however, if desired.

A cylinder 6, provided with a valve-chamber 7, is secured to the main frame, preferably to the lower longitudinal bars 4, and a piston 8 is arranged within said cylinder and provided with a piston-rod 9, extending through the cylinder-heads 10, secured to the ends of the cylinder. The cylinder-heads are preferably provided with a sleeve 11, having a threaded outer surface engaging the cylinder-heads, whereby the sleeves may be adjusted relatively to said heads. An annular packing-flange 12 is arranged between said sleeve and a boss formed on the cylinder-heads and is provided with a threaded outer surface engaging the threaded interior of said boss and with a threaded inner surface adapted to engage the thread on the outer surface of the sleeve. A chamber is left between the end of the flange 12 and the cylinder-head, which may be filled with packing material, so as to make a tight joint between said sleeve and cylinder-head. A bushing 13 is provided with a threaded outer surface adapted to engage the threaded interior of the sleeve 11 and form a packing-box with said sleeve.

The ends of the piston-rod 9 are connected with reciprocating heads 14, which are adapted to slide on ways 15, preferably mounted upon the longitudinal bars 4 at the base of the main frame. Connecting-rods 16 are pivotally attached at one end to said reciprocating heads and at the other end to toggle-links 17 and 18. The links 17 are pivotally attached at their outer ends to the main frame, and the outer ends of the links 18 are pivoted to a vertically-movable table 19, loosely mounted upon the main frame. The frame of the table 19 is preferably constructed of longitudinal bars 20, connected at their ends to transverse bars 21, which are provided with heads having a sliding engagement with the vertical standards 1.

A lever 22, extending horizontally, is secured to the upper end of a vertical shaft 23, having attached to its lower end a horizontally-arranged lever 24, which is pivotally attached to a valve-stem 25, connected with a D-shaped valve of ordinary construction arranged within the valve-chamber 7 and adapted to operate in connection with portholes formed in the cylinder 6. When the lever 22 is moved inward, the vertical shaft 23 is thereby rotated, giving a correspondingly-rotating movement to the lower lever 24, attached to said vertical shaft, which movement operates the valve-stem 25, thereby carrying said valve to the farther end of the valve-chamber and exposing the port-holes of the cylinder nearest to the vertical shaft 23. Water under pressure is then allowed to pass into the valve-chamber 7 through a feed-pipe 26 and through the open port in the cylinder back of the piston when arranged as shown in Fig. 1. The piston is thereby moved from the position indicated in Fig. 1 to the opposite end of said cylinder, where it is stopped by means of the inwardly-projecting end of the sleeve 11, secured to the cylinder-head. Such movement of the piston causes a corresponding movement of the reciprocating heads 14 and connecting-rods 16, which spread the outer ends of the links 17 and 18, and thereby raise the table 19. By adjusting the sleeve 11 so as to project more or less within the cylinder 6 the stroke of the piston is regulated and the upward movement of the table 19 is limited at the desired elevation.

A cylinder 27, larger in diameter than the lower cylinder 6, is secured to the upper portion of the main frame, preferably to the central longitudinal bars 5ᵃ, and is provided with the valve-chamber 28, a piston 29, a piston-rod 30, cylinder-heads 31, and a valve-stem 32, similar in construction to the corresponding elements connected with the lower cylinder 6, hereinbefore described. The ends of said piston-rod 30 are secured to brackets 33 and 33ᵃ, which are mounted upon ways 34 and adapted to slide thereon. A series of sheaves 35 are mounted upon the brackets 33 and 33ᵃ, and a corresponding series of sheaves 36 are mounted upon stationary brackets 37, attached to the outer ends of the main frame of the machine. A single sheave 38 is secured to each end of said main frame, preferably in a plane below that of the sheaves 35 and 36. Cables 39 and 39ᵃ extend from the sliding brackets 33 and 33ᵃ around each of the sheaves 35 and 36 and around the single sheave 38, and from thence to a reciprocating follower 40, having a vertical flange 41, provided with casters 42, which travel on the inner flanges of the central longitudinal bars 5ᵃ.

Attached to one of the reciprocating heads 14 is an arm 43, provided on its outer end with a hub or boss, which engages a rod 44, pivoted on its outer end to the lower end of a lever 45 and provided with stops 48, arranged on each side of the arm 43. The vertical lever 45 is mounted upon a horizontal shaft 46, which is journaled upon brackets 47, secured to the vertical standards 1 of the main frame. The horizontal shaft 46 is also provided with a vertically-extending lever 49, which is pivotally connected with the upper valve-stem 32, attached to a valve arranged within the upper valve-chamber 28. As the lower piston-rod 9 is moved to the opposite end of the cylinder from the position indicated in Fig. 1 the laterally-extending arm 43 of the reciprocating head 14 comes in contact with the stop 48 on the end of the rod 44 and moves said rod and the lower end of the vertical lever 45 inward. Such movement draws forward the upper end of the lever 49 and the upper valve-stem 32, thereby opening the port-hole at the farther end of the upper valve-chamber and allowing water under pressure to enter the upper cylinder and force the piston 39 to the opposite end of the cylinder 31 from that shown in Fig. 1. In so doing the piston-rod 30 moves the sliding brackets 33ᵃ to the right, drawing the sheaves 35 and 36 on the opposite end of the main frame from each other and winding the cable 39 on said sheaves and unwinding the cable 39ᵃ therefrom. The follower 40, attached to the cables 39 and 39ᵃ, is thereby drawn lengthwise of the main frame. When the follower 40 is drawn to the opposite end of the machine from that shown in the drawings, the sliding bracket 33ᵃ at the right of the cylinder is drawn toward the starting-lever 22, attached to the vertical rod 23. Said sliding bracket 33ᵃ is provided with a trip-lever 50, which comes in contact with the lever 22 and moves said lever outward to the position originally occupied by said lever, as indicated in Fig. 4. The lateral movement of said lever rotates the vertical shaft 23 and the lever 24 at the lower end of said shaft and draws outward the valve-stem 25, which allows the water to enter the reverse end of said cylinder and forces the piston back to the position occupied in Fig. 1. In so doing the reciprocating heads 14, attached to the piston-rod 9, and the connecting-rods 16 compress downward the outer ends of the links 17 and 18 and permit the table 19 of the machine to descend to its original position. As the reciprocating head 14 moves toward the position occupied in Fig. 1 it strikes the stop 48, attached to the rod 44, supported on the vertical lever 45, which moves the end of said lever outward and the upper end of the lever 49 inward, thereby reversing the position of the upper valve and piston of the upper cylinder, the upper sliding brackets 33 and 33ᵃ, and cables connected therewith. The follower 40, secured to said cables, is thereby brought back to its original position at the right of the machine. All of the parts will then be in the position indicated in Fig. 1.

The upper portion of the main frame is provided with a presser-board composed of a central section 51, secured to the upper longitudinal bars 5, and side sections 52, having their ends moving in guides or ways formed on the upper transverse bars 2 of the main frame and provided with bearing-plates 52ᵃ. Racks 53 are secured to the outer bars of the side sections 52, the ends of which move in guides or ways secured to the upper longitudinal bars 5 of the main frame. Worm-shafts 54 are journaled in the upper portion of the main frame, preferably upon the longitudinal bars 5ᵃ in the central section of the top of the main frame, and such shafts are provided with worms 55, which engage the toothed racks 53, attached to the side sections of said presser-board. The worms 55 are provided with an outer perforation or nut adapted to engage a wrench or handle, by means of which said worm-shafts may be rotated and the outer sections 52 of the presser-board drawn toward or away from each other, and thereby adjust the width of said presser-board. An endless belt 56 connects the two transverse worm-shafts 54 together, so that both worm-shafts may be adjusted simultaneously and evenly.

A former adapted to hold the required amount of filling material while being compressed and inserted in the mattress-cover is provided with transverse bars 60, secured together by means of longitudinal bars 63, and a central plate 64, extending lengthwise of said bars and secured thereto. Side plates 66, extending lengthwise of said former, are connected at their outer edge to brackets 58 and at their inner edge are free to overlap the central plate 64 of said former. The brackets 58 are provided with vertical arms having side plates 57 secured thereto and with horizontal arms having a sliding engagement with the transverse bars 60, preferably by means of grooves formed in said transverse bars, corresponding with a projecting rib formed on the side of said horizontal arms of said brackets and provided with a toothed rack 59. A worm-shaft 61 extends lengthwise of the transverse bars 60, and its outer ends are provided with worms 62, which are adapted to engage the teeth of the racks 59. The brackets 58 at each end of said former are preferably arranged to engage with opposite sides of the transverse bars 60. The worms on the opposite ends of the shafts 61 are provided with right and left hand threads, respectively, and when rotated draw the side sections of the former toward or away from each other, thereby adjusting the width of said former to the extent desired. The outer sides of said worms are provided with an opening or nut of any suitable construction adapted to receive a wrench or handle, whereby said shafts may be rotated, as already described.

When the machine is in operation, a suitable quantity of the material to be inserted in a mattress-cover is first placed within the former. The former is then placed upon the bed or table 19 of the machine with the ends of the sides 57 of the former bearing against the transverse end plates 67, secured to the main frame of the machine, which end plates serve to close the ends of said former and form, in effect, a rectangular frame within which said material is confined. The width of the presser-board is then adjusted to correspond with the width of the former, so that the outer edges of the presser-board pass within the sides 57 of said former and bear directly upon the filling material. The starting-lever 22 is then moved laterally, thereby operating the valve connected with the lower cylinder and applying hydraulic pressure to the piston contained therein. After the piston has traveled the length of the cylinder it remains stationary, thereby holding the table 19 in its elevated position, with the filling material compressed between said table and the presser-board. At the end of the stroke of the piston 9 the arm 43 of the reciprocating head 14 comes in contact with the stop 48 on the end of the rod 14 and operates the levers 45 and 49 and the valve-stem 32 in the manner already described, thereby applying hydraulic power to the piston in the upper cylinder, which causes the piston of said cylinder to travel lengthwise thereof and move the sliding brackets 33 and 33ª, which draw the follower 40 lengthwise of the machine by means of the cable 39. Such follower forces the material under pressure from the table 19 into the mattress-cover, which is first shirred onto a discharge-hood composed of an upper central section 51, formed of the continuation of the central plate of the top of the machine, and lower plate 70, secured to the transverse end plates 67. Side sections 71 are secured to the side sections of the top of the machine and adjustable therewith, so as to make the hood adjustable in width to correspond with the width of the mattress to be filled. When the follower 40 has traveled the length of the machine and forced the filling under pressure through the discharge-hood into the mattress-cover, the sliding bracket 33ª has been carried toward the starting-lever 22, and coming in contact with said lever it moves the same laterally, which reverses the action of the parts connected with the lower piston 9 and allows the table 19 to descend. The reverse movement of said lower piston 9, in connection with the arm 43 on the reciprocating head 14, reverses the movement of the vertical levers 45 and 49 and upper valve-stem 32, which thereby cause the piston of the upper cylinder to travel back the length of said cylinder and give a reverse movement to the sliding brackets 33 and 33ª, which draws backward the follower 40 into its original position. The machine then stops automatically, and the table 19 and follower 40 will be in the position indicated in Fig. 1.

By means of the construction shown and described herein the filling material may be equally and evenly compressed and forced under pressure into a mattress-cover and by means of such formers constructed separately from the machine. The filling material may be applied to two or more of such formers at the same time while one former is being used in the machine. The machine is therefore at no time idle, and no delay is caused in placing the filling material on the machines and arranging the same evenly and uniformly thereon. As a result a machine of such construction will fill several times more mattresses than can be filled by a machine which must necessarily remain idle while the filling material is arranged evenly and uniformly within a holder or former attached to such machine.

I do not desire to be limited to the specific construction of the several elements shown and described herein. Other constructions having similar capabilities may be used without departing from my invention, the essential elements of which consist of a vertically-movable table mounted upon a main frame and operated by means of a cylinder having a piston-rod and mechanism of suitable construction connecting said piston-rod and table, so as to operate said table when used in connection with a follower adapted to travel lengthwise of a presser-board and operated by a cylinder having a piston with connecting mechanism between said piston and follower adapted to move said follower lengthwise of said plate.

What I claim as new, and desire to secure by Letters Patent, is—

1. The combination with a main frame, of a vertically-movable table, a cylinder having a piston mounted upon a piston-rod intermediate the ends of said rod, connecting mechanism between said piston-rod and table adapted to elevate and depress said table, a presser-board secured to said frame, a follower having a reciprocating movement on said presser-board, a cylinder having a piston mounted upon a piston-rod intermediate the ends of said rod, and means connected with said piston-rod and follower adapted to move said follower along said presser-board, substantially as shown and described.

2. The combination with a main frame, of a vertically-movable table mounted on said frame, a cylinder having a piston provided with a piston-rod, connecting mechanism between said piston-rod and table adapted to elevate and depress said table, a presser-board secured to said main frame, a follower having a reciprocating movement on said presser-board, a cylinder having a piston provided with a piston-rod, and mechanism connected with said piston-rod and follower adapted to move said follower lengthwise of said presser-board, substantially as shown and described.

3. The combination with a main frame, of a vertically-movable table, a cylinder having a piston mounted upon a piston-rod intermediate the ends of said rod, connecting mechanism between said piston-rod and table adapted to elevate and depress said table, substantially as shown and described.

4. The combination with a main frame, of a cylinder having duplicate heads, a piston arranged within said cylinder and provided with a piston-rod extending through said cylinder-heads, reciprocating heads secured to the ends of said piston-rod, a table freely mounted upon said main frame, toggle-links pivotally attached to said table and main frame, and connecting-rods pivotally secured to said reciprocating heads and the inner ends of said links, substantially as shown and described.

5. The combination with a main frame, of a table loosely mounted on said main frame, toggle-links connected with the ends of said main frame and table, a cylinder having duplicate heads, a piston having a rod projecting through said cylinder-heads, reciprocating heads secured to said piston-rod, and connecting-rods pivotally secured to said toggle-links and reciprocating heads, substantially as shown and described.

6. The combination with a main frame, of a table loosely mounted upon said main frame, toggle-links connected with the ends of said main frame and table, a cylinder having duplicate heads provided with adjustable sleeves, a piston having a piston-rod extending through said cylinder-heads, annular packing-flanges having a threaded engagement with the outer surface of said sleeves, bushings having a threaded engagement with the inner surface of said sleeves, reciprocating heads secured to said piston-rod, and connecting-rods pivotally secured to said toggle-links and reciprocating heads, substantially as shown and described.

7. The combination with a main frame, of a presser-board secured to the upper portion of said main frame, a follower adapted to move lengthwise of said presser-board, a cylinder provided with duplicate cylinder-heads, a piston having a rod engaging said cylinder-heads, and mechanism connected with the ends of said piston-rod and with said follower adapted to move said follower on said presser-board, substantially as shown and described.

8. The combination with a main frame, of a presser-board secured thereto, a reciprocating follower, a cylinder having duplicate heads, a piston mounted on a rod passing through said heads, sliding brackets secured to said piston-rod, sheaves mounted on each of said brackets, sheaves secured to the main frame, cables secured to said brackets extending around said sheaves and connected with said reciprocating follower, substantially as shown and described.

9. The combination with a main frame, of a vertically-movable table mounted on said main frame, a lower cylinder, a piston having a piston-rod connected with reciprocating heads, toggle-links connected with said table and main frame, rods connecting said toggle-links with said reciprocating heads, a presser-board secured to the upper portion of said frame, a cylinder mounted upon the upper portion of said main frame, a piston provided with a piston-rod, a valve connected with said cylinder and mechanism connected with said lower piston-rod adapted to operate the valve of the upper cylinder, substantially as shown and described.

10. The combination with a main frame, of an upper cylinder secured thereto, a piston provided with a piston-rod operating within said cylinder, sliding brackets connected with said piston-rod, sheaves mounted on said brackets, sheaves mounted on the ends of said main frame, a reciprocating follower, cables connected with said follower and the sheaves of said sliding brackets and main frame, a trip-lever connected with one of said sliding brackets, a vertical shaft provided with an upper and lower horizontal arm, a lower cylinder having a piston provided with a rod, a sliding valve connected with said cylinder, and a valve-stem connected with said valve and lower arm of said vertical shaft, substantially as shown and described.

11. The combination with a main frame, of a vertically-movable table secured to said frame, a cylinder, a piston mounted upon a piston-rod arranged within said cylinder, a valve connected with said cylinder, reciprocating heads connected with said piston-rod, toggle-links connected with said table and main frame, rods connecting said toggle-links with said reciprocating heads, an upper cylinder, a piston arranged within said cylinder and provided with a piston-rod, a valve connected with said piston, sliding brackets connected with said piston-rod, sheaves mounted upon said sliding brackets and main frame, a reciprocating follower, cables connecting said reciprocating follower, sliding brackets and sheaves, and mechanism connected with said piston-rods whereby a reciprocating movement of the lower piston-rod operates the valve of the upper cylinder, and a reciprocating movement of the piston of the upper cylinder operates the valve of the lower cylinder, substantially as shown and described.

In testimony whereof I affix my signature in presence of two witnesses.

HOMER ECKERSON.

Witnesses:
CHAS. H. MILLS,
ROBERT W. HARDIE.